US012652444B2

(12) United States Patent
Heilbron et al.

(10) Patent No.: US 12,652,444 B2
(45) Date of Patent: Jun. 9, 2026

(54) DETERMINING TOPIC CHAPTERS FOR DIGITAL VIDEOS UTILIZING VIDEO SEGMENTATION MACHINE LEARNING MODELS

(71) Applicant: Adobe Inc., San Jose, CA (US)

(72) Inventors: Fabian David Caba Heilbron, Campbell, CA (US); Franck Dernoncourt, Seattle, WA (US); Linzi Xing, Vancouver (CA); Quan Tran, San Jose, CA (US); Seunghyun Yoon, Seoul (KR); Trung Bui, San Jose, CA (US); Zhaowen Wang, San Jose, CA (US)

(73) Assignee: Adobe Inc., San Jose, CA (US)

( * ) Notice: Subject to any disclaimer, the term of this patent is extended or adjusted under 35 U.S.C. 154(b) by 9 days.

(21) Appl. No.: 18/829,794

(22) Filed: Sep. 10, 2024

(65) Prior Publication Data

US 2026/0075295 A1 Mar. 12, 2026

(51) Int. Cl.
| | |
|---|---|
| *H04N 21/84* | (2011.01) |
| *G06V 10/44* | (2022.01) |
| *H04N 21/845* | (2011.01) |

(52) U.S. Cl.
CPC ............. *H04N 21/84* (2013.01); *G06V 10/44* (2022.01); *H04N 21/8456* (2013.01)

(58) Field of Classification Search
CPC ..... H04N 21/84; H04N 21/8456; G06V 10/44
See application file for complete search history.

(56) References Cited

U.S. PATENT DOCUMENTS

| | | | | |
|---|---|---|---|---|
| 10,643,074 | B1 * | 5/2020 | McAninly | .......... H04N 21/8456 |
| 11,252,327 | B1 * | 2/2022 | Chaganti | .............. G11B 27/031 |

(Continued)

FOREIGN PATENT DOCUMENTS

| | | | | |
|---|---|---|---|---|
| WO | WO-2020190112 A1 * | 9/2020 | ....... | H04N 1/234336 |
| WO | WO-2025172932 A1 * | 8/2025 | ........... | H04N 21/252 |

OTHER PUBLICATIONS

Alam, T., Khan, A., Alam, F.: Punctuation restoration using transformer models for high- and low-resource languages. In: Proceedings of the Sixth Workshop on Noisy User-generated Text (W-NUT 2020). pp. 132-142 (2020).

(Continued)

*Primary Examiner* — Fernando Alcon
(74) *Attorney, Agent, or Firm* — Keller Preece PLLC

(57) ABSTRACT

The present disclosure relates to systems, non-transitory computer-readable media, and methods for segmenting digital videos into topic chapters. In particular, in some embodiments, the disclosed systems generate, utilizing a text encoder, a text representation for a transcript sentence of a video transcript. In addition, in some embodiments, the disclosed systems generate, utilizing a frame encoder, a set of frame representations for a set of video frames associated with the transcript sentence. Moreover, in some embodiments, the disclosed systems generate, utilizing a cross-modal attention model, a text-aware visual representation from the text representation and the set of frame representations. Furthermore, in some embodiments, the disclosed systems determine a topic-boundary label for the transcript sentence from the text representation and the text-aware visual representation.

20 Claims, 8 Drawing Sheets

(56) References Cited

U.S. PATENT DOCUMENTS

| | | | | |
|---|---|---|---|---|
| 2018/0352280 | A1* | 12/2018 | Lim | H04N 21/812 |
| 2018/0359530 | A1* | 12/2018 | Marlow | G11B 27/031 |
| 2020/0402541 | A1* | 12/2020 | Talbot | G11B 27/036 |
| 2021/0117685 | A1* | 4/2021 | Sureshkumar | H04N 21/44016 |
| 2022/0058215 | A1* | 2/2022 | Johnson | G06F 16/438 |
| 2022/0103912 | A1* | 3/2022 | Hornsby | H04N 21/8456 |
| 2023/0360381 | A1* | 11/2023 | Lee | G06V 10/82 |
| 2023/0394854 | A1* | 12/2023 | Polavaram | G06V 20/41 |
| 2024/0357217 | A1* | 10/2024 | Mazaheri | H04N 21/8549 |
| 2025/0142183 | A1* | 5/2025 | Lineback | H04N 21/8456 |
| 2025/0265842 | A1* | 8/2025 | Ghose | G06V 20/46 |
| 2025/0267317 | A1* | 8/2025 | Ghose | H04N 21/23418 |
| 2025/0292573 | A1* | 9/2025 | Rogers | G10L 15/1815 |

OTHER PUBLICATIONS

Beeferman, D., Berger, A., Lafferty, J.: Statistical models for text segmentation. Machine Learning 34(1), 177-210 (1999).

Chen, S., Nie, X., Fan, D.D., Zhang, D., Bhat, V., Hamid, R.: Shot contrastive self-supervised learning for scene boundary detection. In: Proceedings of CVPR 2021. pp. 9796-9805 (2021).

Devlin, J., Chang, M.W., Lee, K., Toutanova, K.: Bert: Pre-training of deep bidirectional transformers for language understanding. In: Proceedings of NAACL 2019. pp. 4171-4186. Association for Computational Linguistics (2019).

Eisenstein, J., Barzilay, R.: Bayesian unsupervised topic segmentation. In: Proceedings of Empirical Methods in Natural Language Proessing (EMNLP), pp. 334-343 (2008).

Fraser, C., Kim, J., Shin, H., Brandt, J., Dontcheva, M.: Temporal segmentation of creative live streams. In: Proceedings of CHI 2020. pp. 1-12 (2020).

Georgescul, M., Clark, A., Armstrong, S.: An analysis of quantitative aspects in the evaluation of thematic segmentation algorithms. In: Proceedings of SIGdial Workshop on Discourse and Dialouge, pp. 144-151 (2006).

Glavaš, G., Nanni, F., Ponzetto, S.P.: Unsupervised text segmentation using semantic relatedness graphs. In: Proceedings of the Fifth Joint Conference on Lexical and Computational Semantics. pp. 125-130 (2016).

He, K., Zhang, X., Ren, S., Sun, J.: Deep residual learning for image recognition. In: Proceedings of IEEE Conference on Computer Vision and Pattern Recognition (CVPR). pp. 770-778 (2016).

Hearst, M.A.: Text tiling: Segmenting text into multi-paragraph subtopic passages. Computational Linguistics 23(1), 33-64 (1997).

Koshorek, O., Cohen, A., Mor, N., Rotman, M., Berant, J.: Text segmentation as a supervised learning task. In: Proceedings of the 2018 Conference of the North American Chapter of the Association for Computational Linguistics: Human Language Technologies (NAACL). pp. 469-473 (2018).

Li, J., Sun, A., Joty, S.: Segbot: A generic neural text segmentation model with pointer network. In: Proceedings of International Joint Conference on Artificial Intelligence (IJCAI-18). pp. 4166-4172 (2018).

Lukasik, M., Dadachev, B., Papineni, K., Simões, G.: Text segmentation by cross segment attention. In: Proceedings of Empirical Methods in Natural Language Processing (EMNLP). pp. 4707-4716 (2020).

Rao, A., Xu, L., Xiong, Y., Xu, G., Huang, Q., Zhou, B., Lin, D.: A local-to-global approach to multi-modal movie scene segmentation. In: IEEE Conference on Computer Vision and Pattern Recognition (CVPR). pp. 10146-10155 (2020).

Rasheed, Z., Shah, M.: Scene detection in hollywood movies and tv shows. In: IEEE Computer Society Conference on Computer Vision and Pattern Recognition (CVPR). pp. 1-8 (2003).

Rui, Y., Huang, T.S., Mehrotra, S.: Exploring video structure beyond the shots. In: Proceedings of the IEEE International Conference on Multimedia Computing and Systems. pp. 237-240 (1998).

Souček, T., Lokoč, J.: Transnet v2: An effective deep network architecture for fast shot transition detection. ArXiv abs/2008.04838 (2020).

Xiao, S., Chen, L., Zhang, S., Ji, W., Shao, J., Ye, L., Xiao, J.: Boundary proposal network for two-stage natural language video localization. In: Proceedings of AAAI Conference on Artificial Intelligence (AAAI-21). pp. 2986-2994 (2021).

Xing, L., Carenini, G.: Improving unsupervised dialogue topic segmentation with utterance-pair coherence scoring. In: Proceedings of SIGdial 2021. pp. 167-177 (2021).

Xing, L., Hackinen, B., Carenini, G., Trebbi, F.: Improving context modeling in neural topic segmentation. In: Proceedings of Association for Computational Linguistics and International Joint Conference on Natural Language Processing (AACL-IJCNLP). pp. 626-636 (2020).

Xing, L., Huber, P., Carenini, G.: Improving topic segmentation by injecting discourse dependencies. In: Proceedings of the 3rd Workshop on Computational Approaches to Discourse. pp. 7-18 (2022).

Zhu, W., Pang, B., Thapliyal, A.V., Wang, W.Y., Soricut, R.: End-to-end dense video captioning as sequence generation. In: Proceedings of Conference on Computational Linguistics (COLING). pp. 5651-5665 (2022).

* cited by examiner

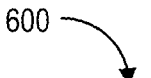
600

Generating A Text Representation For A Transcript Sentence Of A Video Transcript _602_

Utilizing A Text Encoder To Encode Contextualized Features Of The Transcript Sentence _602a_

Generating A Set Of Frame Representations For A Set Of Video Frames Associated With The Transcript Sentence _604_

Utilizing A Frame Encoder To Extract Features Of Visual Signals Within A Time Interval Corresponding To A Beginning Time Stamp And An Ending Time Stamp Of The Transcript Sentence _604a_

Generating A Text-Aware Visual Representation From The Text Representation And The Set Of Frame Representations _606_

Utilizing A Cross-Modal Attention Model To Combine A Query Vector And A Key Matrix To Generate The Text-Aware Visual Representation _606a_

Determining A Topic-Boundary Label For The Transcript Sentence From The Text Representation And The Text-Aware Visual Representation _608_

Utilizing A Topic-Boundary Prediction Model To Determine A Binary Prediction For The Topic-Boundary Label By Comparing Hidden States Of The Transcript Sentence With A Predetermined Topic-Boundary Threshold _608a_

Computing Device
*700*

Processor
*702*

Memory
*704*

Storage
*706*

I/O Interface
*708*

Communication Interface
*710*

DETERMINING TOPIC CHAPTERS FOR DIGITAL VIDEOS UTILIZING VIDEO SEGMENTATION MACHINE LEARNING MODELS

BACKGROUND

Topic segmentation of digital videos is an increasingly important task in the fields of digital content creation, editing, and sharing. As video has become a more prevalent medium of recording and sharing content, computing systems are used more and more to edit or otherwise interact with digital videos. In particular, the practice of dividing digital videos into topic chapters has recently seen an increase in use across many digital content platforms. However, existing video segmentation systems continue to suffer from inaccuracies by generating imprecise topic chapters for digital videos.

BRIEF SUMMARY

Embodiments of the present disclosure provide benefits and/or solve one or more problems in the art with systems, non-transitory computer-readable media, and methods for segmenting digital videos into topic chapters utilizing video segmentation machine learning models. To illustrate, in some embodiments, the disclosed systems process a transcript of a digital video and frames of the digital video utilizing a multi-modal segmentation model to determine sentences of the transcript that border a new topic in the video/transcript. In particular, in some implementations, the disclosed systems process sentences of the transcript through a text encoder to generate text representations. Moreover, in some implementations, the disclosed systems process frames of the video through a frame encoder to generate frame representations. Additionally, in some embodiments, the disclosed systems utilize a cross-modal attention model to generate text-aware visual representations from the text representations and the frame representations. Furthermore, in some embodiments, the disclosed systems utilize the text-aware visual representations to determine topic-boundary labels for the transcript sentences that indicate a change in topic in the video transcript.

The following description sets forth additional features and advantages of one or more embodiments of the disclosed methods, non-transitory computer-readable media, and systems. In some cases, such features and advantages are evident to a skilled artisan having the benefit of this disclosure, or may be learned by the practice of the disclosed embodiments.

BRIEF DESCRIPTION OF THE DRAWINGS

The detailed description provides one or more embodiments with additional specificity and detail through the use of the accompanying drawings, as briefly described below.

FIG. 6 illustrates a flowchart of a series of acts for segmenting digital videos into topic chapters in accordance with one or more embodiments.

DETAILED DESCRIPTION

Figure 1:
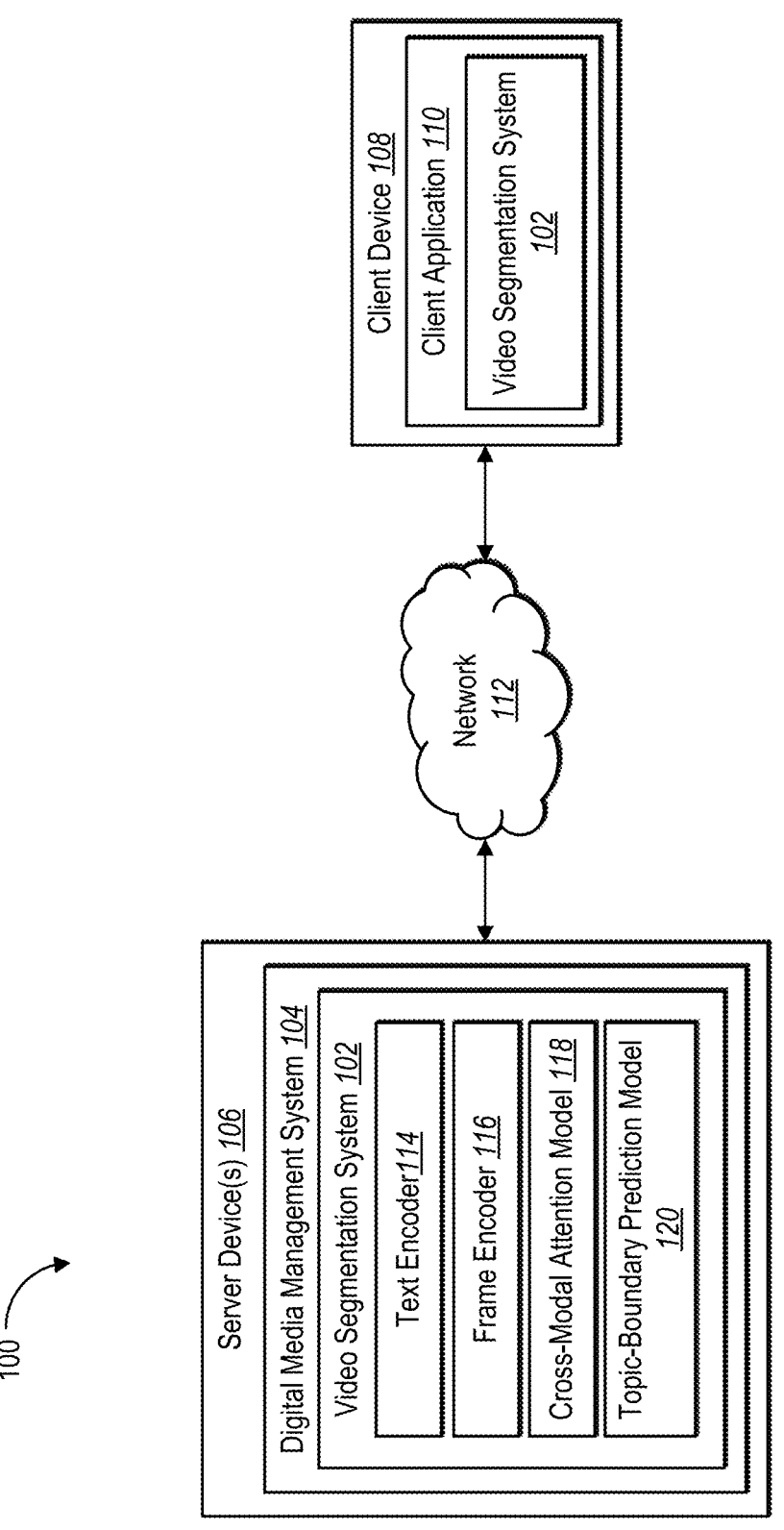
FIG. 1 illustrates a diagram of an environment in which a video segmentation system operates in accordance with one or more embodiments.

This disclosure describes one or more embodiments of a video segmentation system that utilizes video segmentation machine learning models to determine topic-boundary labels for video segments. To illustrate, in some embodiments, the video segmentation system utilizes a multi-modal segmentation model to determine sentences of the transcript that border a new topic in the transcript. In particular, in some implementations, the video segmentation system processes sentences of the transcript through a text encoder to generate text representations. Moreover, in some implementations, the video segmentation system processes frames of the video through a frame encoder to generate frame representations. Additionally, in some embodiments, the video segmentation system utilizes a cross-modal attention model to generate text-aware visual representations from the text representations and the frame representations. Furthermore, in some embodiments, the video segmentation system utilizes the text-aware visual representations to determine topic-boundary labels for the transcript sentences that indicate changes in topic in the video transcript.

As described in further detail below, in some implementations, the video segmentation system divides videos into segments that have video frames (e.g., clips or segments of the video) that address a common topic. In other words, the video segmentation system segments a video into a sequence of topically coherent portions, placing boundaries where transitions in topic occur in the video. By performing this up-stream task, the video segmentation system helps to simplify video comprehension (e.g., for down-stream machine learning tasks, such as finding content of interest, video summarization, and/or query-driven video localization).

As mentioned, in some implementations, the video segmentation system utilizes a multi-modal segmentation model for video topic segmentation. To illustrate, in some embodiments, the video segmentation system obtains a video transcript aligned with visual frames of a digital video (e.g., via timestamps). In some implementations, the video segmentation system utilizes both the transcript and the video frames to perform video topic segmentation. In some cases, using both textual features (from the transcript) and visual features (from the video frames) enhances segmentation performance, as the textual and visual features work together to more comprehensively reflect the digital video's topic-related semantics. To illustrate, the video segmentation system utilizes machine learning models (e.g., neural networks) equipped with a cross-modal attention mechanism that integrates textual and visual signals in a complimentary manner (e.g., going beyond mere fusion).

Although existing systems divide a digital video into chapter segments, such systems face problems with accuracy. For instance, existing systems often target shot or scene detection by merely leveraging surface visual features such as spatiotemporal aspects or frame colors. These systems typically measure temporal similarity along a video timeline to predict shot or scene boundaries. Moreover, some existing systems seek to uncover a semantic structure of a document (a monologue or dialogue) by dividing it into segments of topical sentences. However, existing systems often produce unreliable and imprecise chapter segments because they miss important contextual information that a transcript jointly shares with visual cues in the frames of the video.

The video segmentation system provides advantages relative to existing systems. For example, the video segmentation system improves accuracy relative to existing systems by combining textual and visual features in a cross-modal attention mechanism, thereby capturing the contextual information that a video transcript jointly shares with video frames. As detailed below with empirical results, the video segmentation system outperforms existing video segmentation systems by a substantial margin on several performance metrics. In particular, by combining text encodings with visual encodings in a cross-modal attention model, the video segmentation system improves accuracy of video topic segmentation over existing systems across evaluation metrics for $F_1$ performance, $P_r$ error, and mIoU scores.

Additional detail will now be provided in relation to illustrative figures portraying example embodiments and implementations of a video segmentation system. For example, FIG. 1 illustrates a system 100 (or environment) in which a video segmentation system 102 operates in accordance with one or more embodiments. As illustrated, the system 100 includes server device(s) 106, a network 112, and a client device 108. As further illustrated, the server device(s) 106 and the client device 108 communicate with one another via the network 112.

As shown in FIG. 1, the server device(s) 106 includes a digital media management system 104 that further includes the video segmentation system 102. In some embodiments, the video segmentation system 102 utilizes one or more video segmentation machine learning models (e.g., text encoder 114, frame encoder 116, cross-modal attention model 118, and/or topic-boundary prediction model 120) to determine topic chapters for a digital video. For example, in some implementations, the video segmentation system 102 utilizes the machine learning models to generate topic-boundary labels for sentences of a video transcript and their corresponding video frames. In some embodiments, the server device(s) 106 includes, but is not limited to, a computing device (such as explained below with reference to FIG. 7).

A machine learning model includes a computer representation that is tunable (e.g., trained) based on inputs to approximate unknown functions used for generating corresponding outputs. In particular, in one or more embodiments, a machine learning model is a computer-implemented model that utilizes algorithms to learn from, and make predictions on, known data by analyzing the known data to learn to generate outputs that reflect patterns and attributes of the known data. For instance, in some cases, a machine learning model includes, but is not limited to, a neural network (e.g., a convolutional neural network, recurrent neural network, or other deep learning network), a decision tree (e.g., a gradient boosted decision tree), support vector learning, Bayesian networks, a transformer-based model, a diffusion model, or a combination thereof.

Similarly, a neural network includes a machine learning model that is trainable and/or tunable based on inputs to determine classifications and/or scores, or to approximate unknown functions. For example, in some cases, a neural network includes a model of interconnected artificial neurons (e.g., organized in layers) that communicate and learn to approximate complex functions and generate outputs based on inputs provided to the neural network. In some cases, a neural network refers to an algorithm (or set of algorithms) that implements deep learning techniques to model high-level abstractions in data. A neural network includes various layers such as an input layer, one or more hidden layers, and an output layer that each perform tasks for processing data. For example, a neural network includes a deep neural network, a convolutional neural network, a diffusion neural network, a recurrent neural network (e.g., an LSTM), a graph neural network, a transformer, or a generative adversarial neural network.

In some instances, the video segmentation system 102 receives a request (e.g., from the client device 108) to segment a digital video. For example, the video segmentation system 102 obtains the digital video and receives a request to divide the digital video into chapters (e.g., video portions separated by changes in discussion topics). Some embodiments of server device(s) 106 perform a variety of functions via the digital media management system 104 on the server device(s) 106. To illustrate, the server device(s) 106 (through the video segmentation system 102 on the digital media management system 104) performs functions such as, but not limited to, generating text representations for transcript sentences, generating frame representations for video frames, generating text-aware visual representations associated with transcript sentences, and determining topic-boundary labels for transcript sentences. In some embodiments, the server device(s) 106 utilizes the text encoder 114, the frame encoder 116, the cross-modal attention model 118, and/or the topic-boundary prediction model 120 to generate representations and/or determine labels. In some embodiments, the server device(s) 106 trains the text encoder 114, the frame encoder 116, the cross-modal attention model 118, and/or the topic-boundary prediction model 120.

Furthermore, as shown in FIG. 1, the system 100 includes the client device 108. In some embodiments, the client device 108 includes, but is not limited to, a mobile device (e.g., a smartphone, a tablet), a laptop computer, a desktop computer, or any other type of computing device, including those explained below with reference to FIG. 7. Some embodiments of client device 108 perform a variety of functions via a client application 110 on client device 108. For example, the client device 108 (through the client application 110) performs functions such as, but not limited to, generating text representations for transcript sentences, generating frame representations for video frames, generating text-aware visual representations associated with transcript sentences, and determining topic-boundary labels for transcript sentences. In some embodiments, the client device 108 utilizes the text encoder 114, the frame encoder 116, the cross-modal attention model 118, and/or the topic-boundary prediction model 120 to generate representations and/or determine labels. In some embodiments, the client device 108 trains the text encoder 114, the frame encoder 116, the cross-modal attention model 118, and/or the topic-boundary prediction model 120.

To access the functionalities of the video segmentation system 102 (as described above and in greater detail below), in one or more embodiments, a user interacts with the client application 110 on the client device 108. For example, the client application 110 includes one or more software applications (e.g., to segment digital videos by topic in accordance with one or more embodiments described herein) installed on the client device 108, such as a digital media management application and/or a video editing application. In certain instances, the client application 110 is hosted on the server device(s) 106. Additionally, when hosted on the server device(s) 106, the client application 110 is accessed by the client device 108 through a web browser and/or another online interfacing platform and/or tool. Furthermore, in some embodiments, the client device 108, the server device(s) 106, or another system host one or more databases including digital data.

As illustrated in FIG. 1, in some embodiments, the video segmentation system 102 is hosted by the client application 110 on the client device 108 (e.g., additionally, or alternatively to being hosted by the digital media management system 104 on the server device(s) 106). For example, the video segmentation system 102 performs the video topic segmentation techniques described herein on the client device 108. In some implementations, the video segmentation system 102 utilizes the server device(s) 106 to train and implement machine learning models (such as the text encoder 114, the frame encoder 116, the cross-modal attention model 118, and/or the topic-boundary prediction model 120). In one or more embodiments, the video segmentation system 102 utilizes the server device(s) 106 to train machine learning models (such as the text encoder 114, the frame encoder 116, the cross-modal attention model 118, and/or the topic-boundary prediction model 120) and utilizes the client device 108 to implement or apply the machine learning models.

Further, although FIG. 1 illustrates the video segmentation system 102 being implemented by a particular component and/or device within the system 100 (e.g., the server device(s) 106 and/or the client device 108), in some embodiments the video segmentation system 102 is implemented, in whole or in part, by other computing devices and/or components in the system 100. For instance, in some embodiments, the video segmentation system 102 is implemented on another client device. More specifically, in one or more embodiments, the description of (and acts performed by) the video segmentation system 102 are implemented by (or performed by) the client application 110 on another client device.

In some embodiments, the client application 110 includes a web hosting application that allows the client device 108 to interact with content and services hosted on the server device(s) 106. To illustrate, in one or more implementations, the client device 108 accesses a web page or computing application supported by the server device(s) 106. The client device 108 provides input to the server device(s) 106 (e.g., a request to segment a digital video into topic chapters). In response, the video segmentation system 102 on the server device(s) 106 performs operations described herein to utilize video segmentation machine learning models to segment the digital video. The server device(s) 106 provides the output or results of the operations (e.g., topic-boundary labels for sentences of a video transcript for the digital video, video topic chapters, etc.) to the client device 108. As another example, in some implementations, the video segmentation system 102 on the client device 108 performs operations described herein to utilize video segmentation machine learning models to segment a digital video. The client device 108 provides the output or results of the operations (e.g., topic-boundary labels for sentences of a video transcript for the digital video, video topic chapters, etc.) via a display of the client device 108, and/or transmits the output or results of the operations to another device (e.g., the server device(s) 106 and/or another client device).

Additionally, as shown in FIG. 1, the system 100 includes the network 112. As mentioned above, in some instances, the network 112 enables communication between components of the system 100. In certain embodiments, the network 112 includes a suitable network and communicates using any communication platforms and technologies suitable for transporting data and/or communication signals, examples of which are described with reference to FIG. 7. Furthermore, although FIG. 1 illustrates the server device(s) 106 and the client device 108 communicating via the network 112, in certain embodiments, the various components of the system 100 communicate and/or interact via other methods (e.g., the server device(s) 106 and the client device 108 communicate directly).

Figure 2:
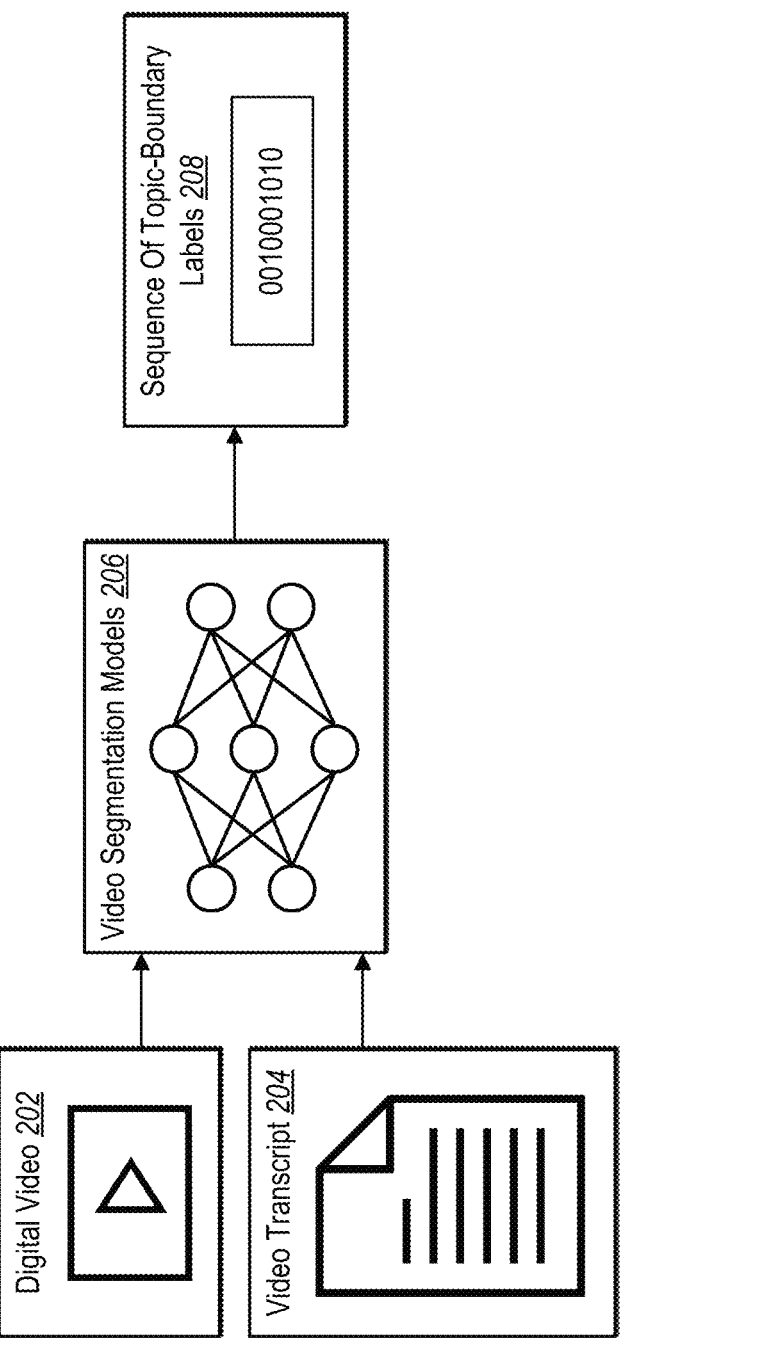
FIG. 2 illustrates the video segmentation system determining a sequence of topic-boundary labels for transcript sentences to segment a digital video in accordance with one or more embodiments.

As mentioned, in some embodiments, the video segmentation system 102 segments digital videos by topic. For instance, FIG. 2 illustrates the video segmentation system 102 determining a sequence of topic-boundary labels for transcript sentences to segment a digital video in accordance with one or more embodiments. Specifically, FIG. 2 shows the video segmentation system 102 obtaining a digital video 202 and a corresponding video transcript 204 (i.e., a transcript of the words and sentences spoken in the digital video 202). Moreover, as shown, in some implementations, the video segmentation system 102 processes the digital video 202 and the video transcript 204 through one or more video segmentation machine learning models 206 (e.g., the text encoder 114, the frame encoder 116, the cross-modal attention model 118, and the topic-boundary prediction model 120) to generate a sequence of topic-boundary labels 208.

In particular, in some embodiments, the video segmentation system 102 determines the sequence of topic-boundary labels 208 for sentences of the video transcript 204 associated with a digital video 202. To illustrate, and as discussed in more detail below, the video segmentation system 102 processes frames of the digital video 202 through a frame encoder to generate frame representations. A frame representation includes a numerical representation of features of an image (e.g., features and/or pixels of a video frame). For instance, in some cases, a frame representation includes a feature vector representation of a video frame. To illustrate, a frame representation includes a latent feature vector representation of a video frame generated by one or more layers of a neural network.

Additionally, the video segmentation system 102 processes sentences of the video transcript 204 through a text encoder to generate text representations. A text representation includes a numerical representation of features of a text string, such as a sentence or phrase spoken in a transcript of a video. For example, a text representation includes a feature vector or other numerical representation of latent features of a transcript sentence. For instance, a text representation includes a feature token, feature vector, or other numerical representation of features of a text string (e.g., features suggesting a semantic connotation or meaning).

Furthermore, in some embodiments, the video segmentation system 102 processes the frame representations and the text representations through a cross-modal attention model to generate text-aware visual representations for the corresponding sentences of the video transcript 204. A text-aware visual representation includes a feature vector or other numerical representation of combined features of a semantic text with related visual images. For example, a text-aware visual representation includes a feature vector representation of video frame features with corresponding semantic sentences spoken while the video frames were captured.

Moreover, in some embodiments, the video segmentation system 102 processes the text-aware visual representations through a topic-boundary prediction model to determine topic-boundary labels for the transcript sentences. A topic-boundary label includes a prediction for a sentence or phrase of a transcript that indicates whether the sentence or phrase borders or overlaps a transition in topics of the transcripts.

In some cases, the video segmentation system 102 utilizes the topic-boundary labels to determine topic chapters for the digital video. For example, the video segmentation system 102 determines the topic chapters for the digital video by pairing the topic-boundary labels in the sequence with time stamps from the video transcript.

As discussed, in some embodiments, the video segmentation system 102 utilizes video segmentation machine learning models to generate representations and determine topic-boundary labels. For instance, FIGS. 3A and 3B illustrate the video segmentation system 102 processing transcript sentences and video frames through video segmentation machine learning models to determine topic-boundary labels for the transcript sentences in accordance with one or more embodiments.

Figure 3A:
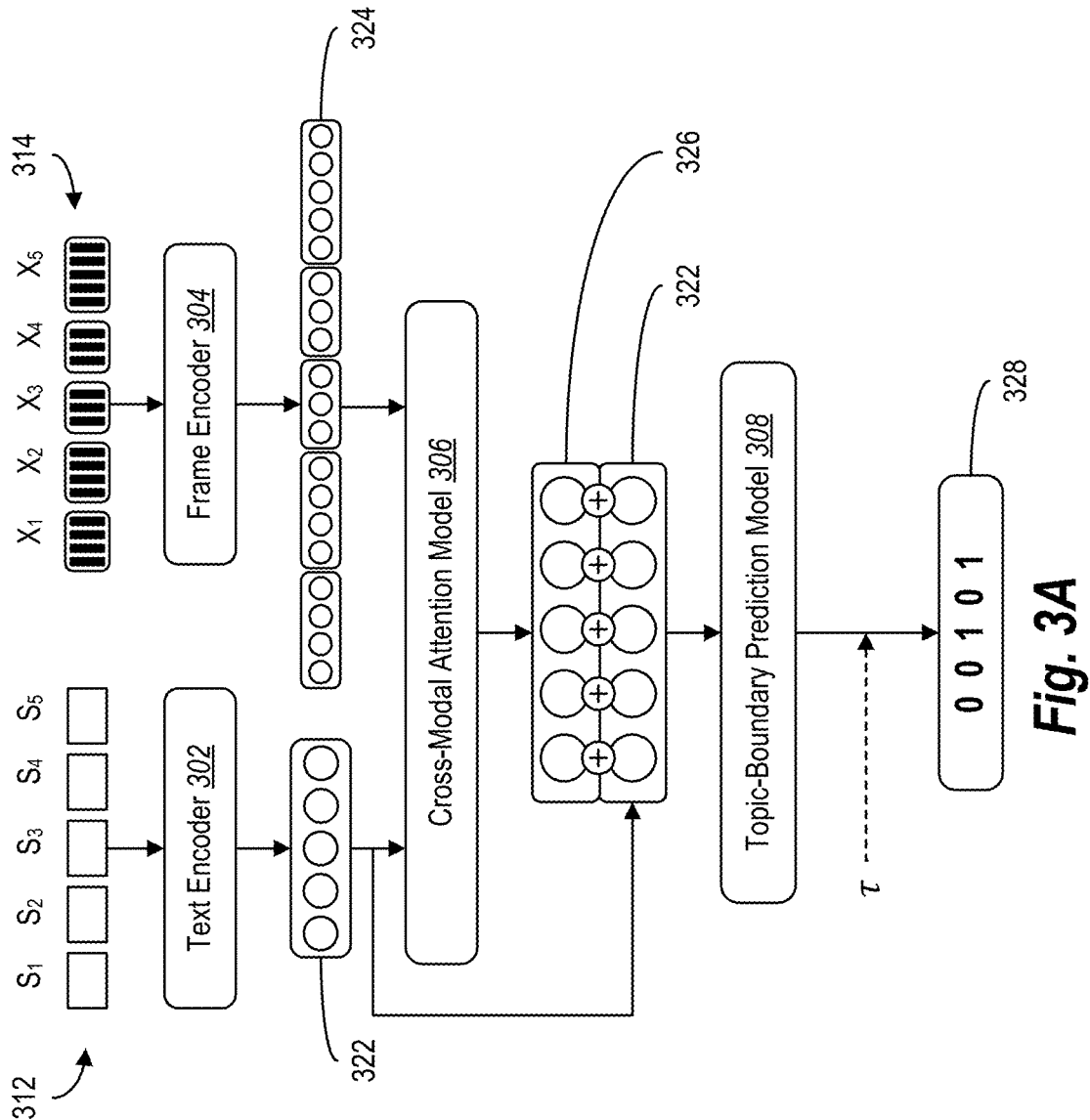
FIGS. 3A-3B illustrate the video segmentation system processing transcript sentences and video frames through video segmentation machine learning models to determine topic-boundary labels for the transcript sentences in accordance with one or more embodiments.
Figure 3B:
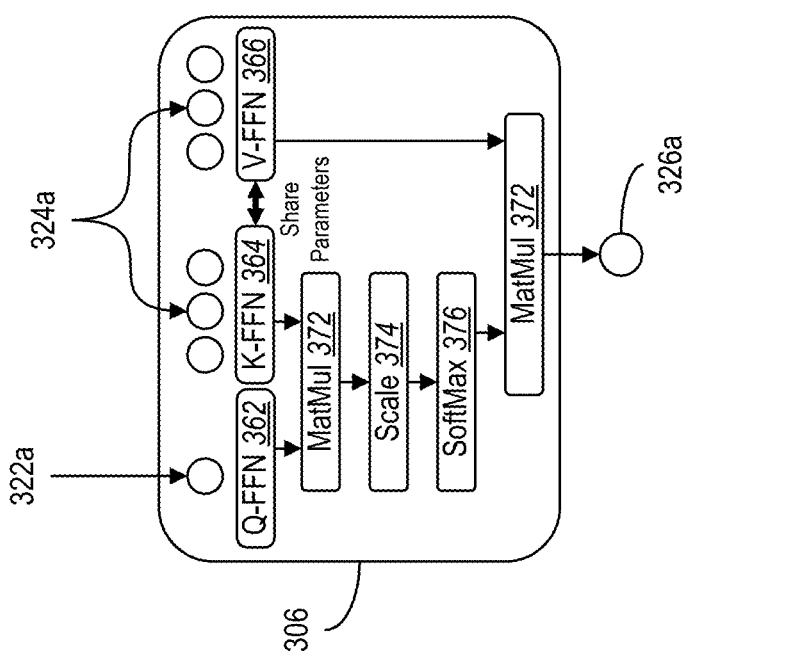

Specifically, FIG. 3A shows the video segmentation system 102 processing a plurality of transcript sentences 312 (e.g., represented symbolically as $s_1$, $s_2$, $s_3$, $s_4$, and $s_5$) of a video transcript through a text encoder 302 (e.g., text encoder 114) to generate a plurality of text representations 322 for the plurality of transcript sentences 312. For example, the video segmentation system 102 utilizes the text encoder 302 to encode contextualized features into a text representation (e.g., a numerical representation) for each transcript sentence of the plurality of transcript sentences 312. In some embodiments, the video segmentation system 102 utilizes a text encoder in the form of a Bidirectional Encoder Representations from Transformers (BERT) model trained to derive sentence embeddings to embed sentences within a metric space. In some cases, the text encoder 302 includes various language models, such as, but not limited to, BERT models, neural word embedding models, and/or global vector models. In one or more implementations, In addition, FIG. 3A shows the video segmentation system 102 processing a plurality of sets of video frames 314 (e.g., represented symbolically as $X_1$, $X_2$, $X_3$, $X_4$, and $X_5$) of a digital video associated with the video transcript through a frame encoder 304 (e.g., frame encoder 116) to generate a plurality of sets of frame representations 324 for the plurality of sets of video frames 314. For example, the video segmentation system 102 utilizes the frame encoder 304 to extract features of visual signals in the frames of each set of video frames 314. In some embodiments, the frame encoder 304 is a neural network (or one or more layers of a neural network) that extract features of a video frame (e.g., localized features or global features of the digital image). In some cases, a frame encoder refers to a neural network that both extracts and encodes features from a video frame. For example, a frame encoder can include a particular number of layers including one or more fully connected and/or partially connected layers of neurons that extract frame patches from the video frame and encode localized and/or global features of the video frame.

Furthermore, FIG. 3A shows the video segmentation system 102 processing the plurality of text representations 322 and the plurality of sets of frame representations 324 through a cross-modal attention model 306 (e.g., cross-modal attention model 118) to generate a plurality of text-aware visual representations 326. Additional detail of the cross-modal attention model 306 is given below in relation to FIG. 3B. A set of video frames corresponds to a transcript sentence. More particularly, a set of video frames includes the video frames within a time interval beginning with a beginning time stamp and ending with an ending time stamp of a corresponding transcript sentence.

Moreover, FIG. 3A shows the video segmentation system 102 processing the plurality of text-aware visual representations 326 and the plurality of text representations 322 through a topic-boundary prediction model 308 (e.g., topic-boundary prediction model 120) to determine a sequence of topic-boundary labels 328 for the plurality of transcript sentences 312. For example, in some embodiments, the video segmentation system 102 combines the text-aware visual representations 326 and the plurality of text representations 322. To illustrate, the video segmentation system 102 concatenates individual text representations with their corresponding text-aware visual representations to process through the topic-boundary prediction model 308.

In some implementations, the topic-boundary prediction model 308 includes a bi-directional LSTM (long short-term memory) and a multilayer perceptron. For instance, in some implementations, the video segmentation system 102 utilizes the bi-directional LSTM of the topic-boundary prediction model 308 to determine hidden states of each transcript sentence from the corresponding combined text-aware visual representation and corresponding text representation. To illustrate, the video segmentation system 102 determines the hidden states of the transcript sentence utilizing the bi-directional LSTM by evaluating contextual features of the transcript sentence in relation to other transcript sentences (e.g., neighboring sentences in the transcript, nearby sentences in the transcript, all sentences in the transcript, etc.). Moreover, in some implementations, the video segmentation system 102 utilizes the multilayer perceptron of the topic-boundary prediction model 308 to determine a binary prediction for each topic-boundary label by comparing the hidden states of each transcript sentence with a predetermined topic-boundary threshold (e.g., represented symbolically as t).

As mentioned, in some embodiments, the video segmentation system 102 approaches video topic segmentation as a sequence labeling task. Thus, the video segmentation system 102 operates on multiple transcript sentences and multiple corresponding sets of video frames to generate a sequence of topic-boundary labels. For example, the video segmentation system 102 generates multiple text-aware visual representations (e.g., a first and a second text-aware visual representation, etc.) for multiple transcript sentences. The video segmentation system 102 likewise determines multiple topic-boundary labels (e.g., a first and a second topic-boundary label, etc.) for the multiple transcript sentences from the multiple text-aware visual representations, as described above. Moreover, the video segmentation system 102 generates a sequence of labels by combining the multiple topic-boundary labels into a sequence of labels for the video transcript.

As mentioned above, in some implementations, the video segmentation system 102 processes the plurality of text representations 322 and the plurality of sets of frame representations 324 through the cross-modal attention model 306 to generate the plurality of text-aware visual representations 326. FIG. 3B shows additional detail of this process.

In particular, FIG. 3B shows the video segmentation system 102 processing a text representation 322a of the plurality of text representations 322 through a query feedforward layer 362 of the cross-modal attention model 306 to generate a query vector. In addition, the video segmentation system 102 processes a set of frame representations 324a (e.g., corresponding in time to the text representation 322a of a corresponding transcript sentence) of the plurality of sets of frame representations 324 through a key feedforward layer 364 of the cross-modal attention model 306 to generate a key matrix. Moreover, in some embodiments, the video segmentation system 102 also processes the set of frame representations 324a through a value feedforward layer 366 of the cross-modal attention model 306 to generate a value matrix. In some implementations, the key feedforward layer 364 and the value feedforward layer 366 share identical parameters. Thus, in some implementations, the video segmentation system 102 generates a value matrix from the set of frame representations 324a that is identical to the key matrix. Alternatively, in some embodiments, the key feedforward layer 364 and the value feedforward layer 366 have different parameters.

Furthermore, in some embodiments, the video segmentation system 102 combines the query vector with the key matrix and the value matrix. For example, the video segmentation system 102 multiplies the query vector and the key matrix in a matrix multiplication operation 372. Additionally, in some embodiments, the video segmentation system 102 utilizes a scaling operation 374 and/or a softmax operation 376 on the product of the query vector and the key matrix. Moreover, the video segmentation system 102 multiplies the result of these operations with the value matrix to generate a text-aware visual representation 326a (e.g., of the plurality of text-aware visual representations 326) for the corresponding transcript sentence. As described above, in some embodiments, the video segmentation system 102 utilizes the text-aware visual representation 326a to generate a topic-boundary label for the corresponding transcript sentence (e.g., by concatenating the text-aware visual representation 326a with its corresponding text representation 322a and processing the concatenated representation through the topic-boundary prediction model 308).

As mentioned, by utilizing the cross-modal attention model 306 to produce text-aware visual representations for each sentence, the video segmentation system 102 enhances accuracy of the topic segmentations by distilling contextual information shared with both modes of the video (i.e., textual and visual information), rather than naively operating mean-pooling over the sets of frame representations covered by the sentence interval. In particular, by utilizing cross-modal attention, the video segmentation system 102 gives more attention weight to those frames that share more semantic meaning with the text. Relatedly, frames with less relevance to semantic meaning (e.g., sharing little or no semantics with the text) are given less attention weight.

The video topic segmentation techniques described above are also represented symbolically. Given a digital video and an associated transcript, the transcript has a sequence of sentences $\{s_1, s_2, \ldots, s_n\}$ along with start time offsets $\{b_1, b_2, \ldots, b_n\}$ and end time offsets $\{e_1, e_2, \ldots, e_n\}$, and the video has video frames $X_v=\{x_1, x_2, \ldots, x_m\}$, where a single frame $x_i$ has a timestamp $t_i$. The video segmentation system 102 predicts a sequence of labels $\{l_1, l_2, \ldots, l_{n-1}\}$ for the sequence of transcript sentences, where $l$ is a binary label in which 1 denotes that the corresponding sentence overlaps a video topic segment boundary, and 0 denotes otherwise. In some implementations, the video segmentation system 102 utilizes a 1 to denote the sentence borders an ending of a topic chapter. Alternatively, in some embodiments, the video segmentation system 102 utilizes a 1 to denote that the sentence borders a beginning of a topic chapter. Moreover, in some implementations, the video segmentation system 102 does not predict a label for the last (or, alternatively, first) sentence $s_n$ of the transcript, as the last sentence (or alternatively, the first sentence) is at the end of a topic segment by default, and therefore is assigned a 1 for the topic-boundary label.

The operation of the text encoder is denoted as $E_t$ and the operation of the frame encoder is denoted as $E_f$. Given a transcript sentence $s_i$ with time interval $[b_i, e_i]$, and a corresponding set of video frames $X_i=\{x_1^i, x_2^i, \ldots, x_m^i\}$ associated with the sentence, the video segmentation system 102 obtains the text representation $tr_i=E_t(s_i)$ and its corresponding set of frame representations $FR_i=\{fr_1^i, fr_2^i, \ldots, fr_m^i\}$ where $fr_k^i=E_f(x_k^i)$.

With the transcript sentence representation $tr_i$ and its corresponding frame representation set $FR_i$, the video segmentation system 102 computes text-aware visual representations $vr_i$ as:

$$vr_i = A_i V_i$$

$$A_i = \text{softmax}\left(\frac{q_i K_i^T}{\sqrt{d_k}}\right)$$

where $q_i \in \mathbb{R}^{1 \times d_k}$, $K_i \in \mathbb{R}^{m \times d_k}$, and $V_i \in \mathbb{R}^{m \times d_k}$ denote the query vector, key matrix, and value matrix, respectively, generated by passing the text representation and set of frame representations through three parallel feedforward layers, namely Q-FFN, K-FFN, and V-FFN, respectively. More formally, $q_i=\text{QFFN}(tr_i)$, $K_i=\text{KFFN}(FR_i)$, and $V_i=\text{VFFN}(FR_i)$. As mentioned, in some embodiments, K-FFN and V-FFN share the same parameters and thus produce identical key and value matrices.

Additionally, in some implementations, the video segmentation system 102 concatenates the text-aware visual representations $\{vr_1, \ldots, vr_n\}$ with their corresponding text representations $\{tr_1, \ldots, tr_n\}$ and feeds them into a bi-directional LSTM layer to perform contextualization and return hidden states. Next, the video segmentation system 102 utilizes a multilayer perceptron followed by softmax to serves as a topic-boundary predictor to make binary predictions regarding the input hidden states according to a threshold t tuned on the validation set. In particular, if a transcript sentence has an output probability that exceeds τ, the sentence is assigned a 1, indicating a topic segment boundary.

In some embodiments, the video segmentation system 102 fine-tunes the video segmentation machine learning models utilizing a cross-entropy loss. Additionally, the video segmentation system 102 was tested on a corpus of video data to empirically verify its effectiveness. The video segmentation system 102 was tested against several existing systems. Three standard metrics were used to evaluate the model performances: $F_1$, which measures the exact match between a ground truth and a model prediction (higher scores denoting better performance); $P_r$ error score, which is the mean of missing and false alarm probabilities, calculated based on the overlap between ground-truth segments and model predictions within a certain size sliding window (lower scores indicate better performance, as this is a penalty metric); and mIoU score, which is an average over maximal Intersection-over-Union of all ground-truth segments to predicted segments (higher scores indicate better performance). The empirical results are given in the following table.

| | $P_r$ | $F_1$ | mIoU |
|---|---|---|---|
| Existing System 1 | 32.89 | 60.48 | 60.00 |
| Existing System 2 | 37.53 | 52.08 | 53.24 |
| Existing System 3 | 38.78 | 52.30 | 51.45 |
| Video Segmentation System 102 | 30.61 | 65.29 | 63.11 |

As shown in the table, the video segmentation system 102 outperforms the existing video segmentation systems in all three performance metrics. Notably, by combining both textual and visual modalities with cross-modal attention fusion, the video segmentation system 102 performs more accurately than existing systems. These results confirm that fusing visual information together with textual information provides a more clear picture of the video's underlying topics.

Figure 4:
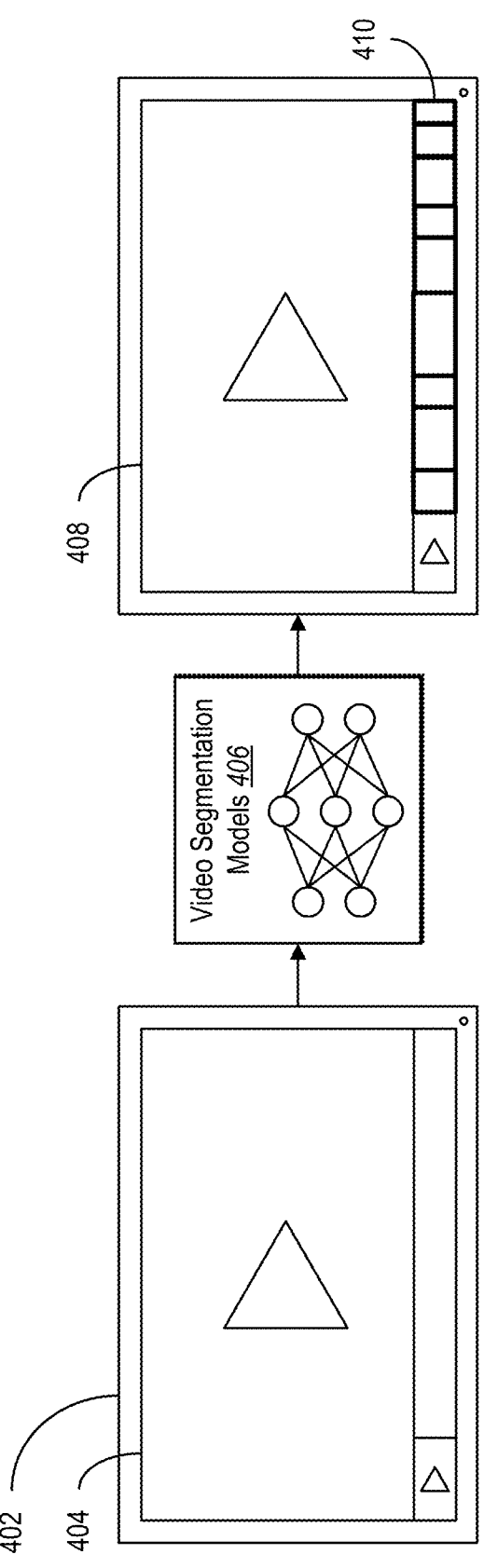
FIG. 4 illustrates the video segmentation system determining topic chapters for a digital video and providing the topic chapters for display in accordance with one or more embodiments.

Turning now to FIG. 4, in some embodiments, the video segmentation system 102 determines topic chapters for a digital video. Moreover, in some implementations, the video segmentation system 102 provides the topic chapters for display via a graphical user interface of a client device (e.g. with the digital video). For instance, FIG. 4 illustrates the video segmentation system 102 determining topic chapters for a digital video and providing the topic chapters for display in accordance with one or more embodiments.

Specifically, FIG. 4 shows a client device 402 displaying a digital video via a graphical user interface 404. The video segmentation system 102 processes the digital video (along with a transcript of spoken word in the video) through video segmentation machine learning models 406 (e.g., the text encoder 114, the frame encoder 116, the cross-modal attention model 118, and the topic-boundary prediction model 120) to determine topic-boundary labels for sentences spoken in the digital video. In particular, the video segmentation system 102 determines topic chapters for the digital video by pairing the topic-boundary labels with time stamps of corresponding sentences of the video transcript.

Moreover, FIG. 4 shows the video segmentation system 102 providing, for display via the client device 402, an updated graphical user interface 408 with the digital video. In particular, the video segmentation system 102 provides topic chapters 410 for display with the digital video.

Figure 5:
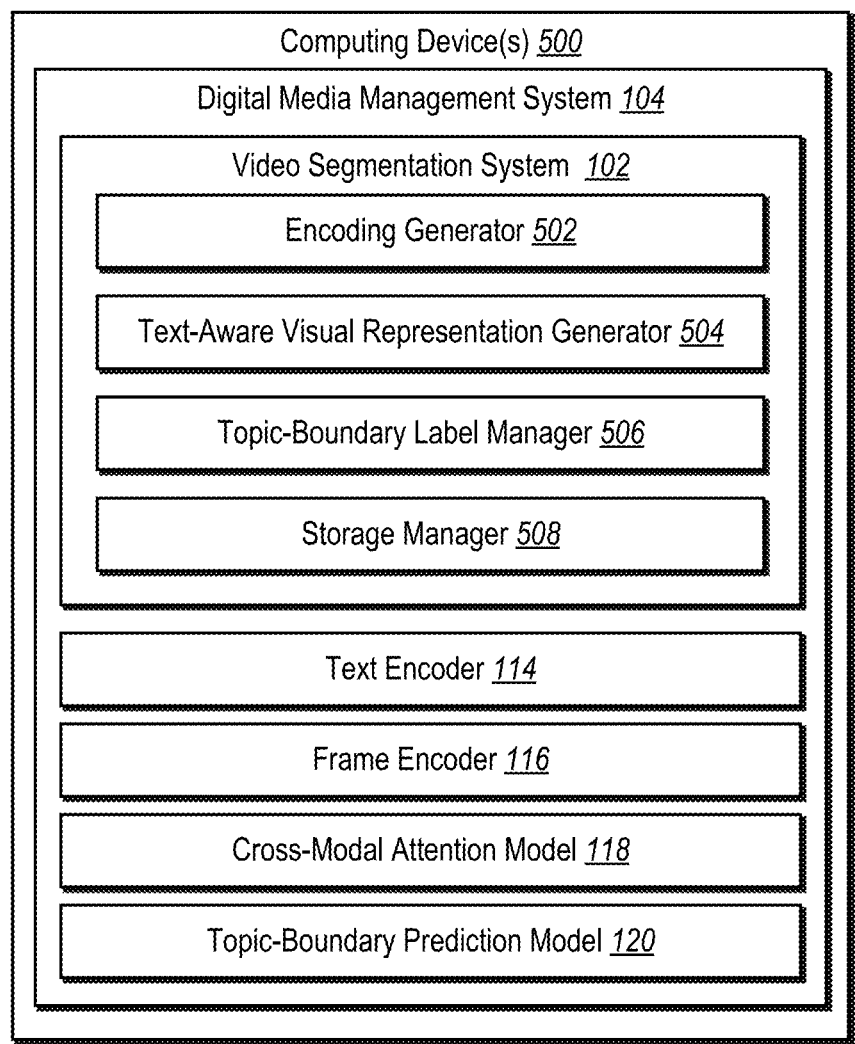
FIG. 5 illustrates a diagram of an example architecture of the video segmentation system in accordance with one or more embodiments.

Turning now to FIG. 5, additional detail will be provided regarding components and capabilities of one or more embodiments of the video segmentation system 102. In particular, FIG. 5 illustrates an example video segmentation system 102 executed by a computing device(s) 500 (e.g., the server device(s) 106 or the client device 108). As shown by the embodiment of FIG. 5, the computing device(s) 500 includes or hosts the digital media management system 104 and/or the video segmentation system 102. Furthermore, as shown in FIG. 5, the video segmentation system 102 includes an encoding generator 502, a text-aware visual representation generator 504, a topic-boundary label manager 506, and a storage manager 508.

As shown in FIG. 5, the video segmentation system 102 includes an encoding generator 502. In some implementations, the encoding generator 502 generates representations for sentences and/or video frames. For instance, the encoding generator 502 utilizes a text encoder to generate text representations for transcript sentences, as described above.

Similarly, the encoding generator 502 utilizes a frame encoder to generate frame representations for video frames, as described above.

In addition, as shown in FIG. 5, the video segmentation system 102 includes a text-aware visual representation generator 504. In some implementations, the text-aware visual representation generator 504 generates text-aware visual representations. For example, the text-aware visual representation generator 504 utilizes a cross-modal attention model to generate text-aware visual representations, as described above.

Moreover, as shown in FIG. 5, the video segmentation system 102 includes a topic-boundary label manager 506. In some implementations, the topic-boundary label manager 506 determines topic-boundary labels for transcript sentences. For instance, the topic-boundary label manager 506 utilizes a bi-directional LSTM of a topic-boundary prediction model to determine hidden states of a transcript sentence, and a multilayer perceptron of the topic-boundary prediction model to determine binary predictions for topic-boundary labels, as described above.

Furthermore, as shown in FIG. 5, the video segmentation system 102 includes a storage manager 508. In some implementations, the storage manager 508 stores information (e.g., via one or more memory devices) on behalf of the video segmentation system 102. For example, the storage manager 508 includes a database for storing text representations, frame representations, text-aware visual representations, and/or topic-boundary labels for transcript sentences.

Each of the components 502-508 of the video segmentation system 102 includes software, hardware, or both. For example, the components 502-508 include one or more instructions stored on a computer-readable storage medium and executable by processors of one or more computing devices, such as a client device or server device. When executed by the one or more processors, in some implementations, the computer-executable instructions of the video segmentation system 102 cause the computing device(s) to perform the methods described herein. Alternatively, in one or more implementations, the components 502-508 include hardware, such as a special purpose processing device to perform a certain function or group of functions. Alternatively, in some implementations, the components 502-508 of the video segmentation system 102 include a combination of computer-executable instructions and hardware.

Furthermore, the components 502-508 of the video segmentation system 102 are, for example, implemented as one or more operating systems, as one or more stand-alone applications, as one or more modules of an application, as one or more plug-ins, as one or more library functions, as one or more functions callable by other applications, and/or as a cloud-computing model. Thus, in some implementations, the components 502-508 are implemented as a stand-alone application, such as a desktop or mobile application. Furthermore, in various implementations, the components 502-508 are implemented as one or more web-based applications hosted on a remote server. In some implementations, the components 502-508 are implemented in a suite of mobile device applications or "apps." To illustrate, in some implementations, the components 502-508 are implemented in an application, including but not limited to ADOBE BEHANCE, ADOBE CREATIVE CLOUD, ADOBE PREMIERE, ADOBE PREMIERE RUSH, and ADOBE SENSEI. The foregoing are either registered trademarks or trademarks of Adobe in the United States and/or other countries.

FIGS. 1-5, the corresponding text, and the examples provide a number of different methods, systems, devices, and non-transitory computer-readable media of the video segmentation system 102. In addition to the foregoing, one or more embodiments are described in terms of flowcharts comprising acts for accomplishing a particular result, as shown in FIG. 6. In some implementations, the processes of the video segmentation system 102 are performed with more or fewer acts. Furthermore, in various implementations, the acts are performed in differing orders. Additionally, in some implementations, the acts described herein are repeated or performed in parallel with one another or in parallel with different instances of the same or similar acts.

As mentioned, FIG. 6 illustrates a flowchart of a series of acts 600 for segmenting digital videos into topic chapters in accordance with one or more implementations. While FIG. 6 illustrates acts according to one implementation, alternative implementations omit, add to, reorder, and/or modify any of the acts shown in FIG. 6. In one or more implementations, the acts of FIG. 6 are performed as part of a method (e.g., a computer-implemented method). Alternatively, in one or more implementations, a non-transitory computer-readable storage medium comprises instructions that, when executed by one or more processors, cause a computing device to perform the acts of FIG. 6. In some implementations, a system performs the acts of FIG. 6.

As shown in FIG. 6, the series of acts 600 includes an act 602 of generating a text representation for a transcript sentence of a video transcript, an act 602a of utilizing a text encoder to encode contextualized features of the transcript sentence, an act 604 of generating a set of frame representations for a set of video frames associated with the transcript sentence, an act 604a of utilizing a frame encoder to extract features of visual signals within a time interval corresponding to a beginning time stamp and an ending time stamp of the transcript sentence, an act 606 of generating a text-aware visual representation from the text representation and the set of frame representations, an act 606a of utilizing a cross-modal attention model to combine a query vector and a key matrix to generate the text-aware visual representation, an act 608 of determining a topic-boundary label for the transcript sentence from the text representation and the text-aware visual representation, and an act 608a of utilizing a topic-boundary prediction model to determine a binary prediction for the topic-boundary label by comparing hidden states of the transcript sentence with a predetermined topic-boundary threshold.

In particular, in some implementations, the act 602 includes generating, utilizing a text encoder, a text representation for a transcript sentence of a video transcript, the act 604 includes generating, utilizing a frame encoder, a set of frame representations for a set of video frames associated with the transcript sentence, the act 606 includes generating, utilizing a cross-modal attention model, a text-aware visual representation from the text representation and the set of frame representations, and the act 608 includes determining a topic-boundary label for the transcript sentence from the text representation and the text-aware visual representation.

For example, in some implementations, the series of acts 600 includes generating the text representation for the transcript sentence by encoding contextualized features of the transcript sentence. Moreover, in some implementations, the series of acts 600 includes generating the set of frame representations for the set of video frames by extracting features of visual signals of video frames within a time interval corresponding to a beginning time stamp and an ending time stamp of the transcript sentence. Furthermore, in some implementations, the series of acts 600 includes generating the text-aware visual representation by: determining a query vector from the text representation; determining a key matrix from the set of frame representations; and combining the query vector and the key matrix to generate the text-aware visual representation.

Additionally, in some implementations, the series of acts 600 includes determining the topic-boundary label for the transcript sentence by: combining the text-aware visual representation and the text representation; determining hidden states of the transcript sentence from the combined text-aware visual representation and the text representation; and determining a binary prediction for the topic-boundary label by comparing the hidden states with a predetermined topic-boundary threshold.

Moreover, in some implementations, the series of acts 600 includes determining an additional topic-boundary label for an additional transcript sentence; and combining the topic-boundary label and the additional topic-boundary label into a sequence of labels for the video transcript. Furthermore, in some implementations, the series of acts 600 includes determining topic chapters for a video associated with the video transcript by pairing topic-boundary labels in the sequence of labels with time stamps from the video transcript.

In addition, in some implementations, the series of acts 600 includes generating, utilizing a text encoder, a plurality of text representations for a plurality of transcript sentences of a video transcript. In some implementations, the series of acts 600 includes generating, utilizing a frame encoder, a plurality of sets of frame representations for a plurality of sets of video frames associated with the plurality of transcript sentences. In some implementations, the series of acts 600 includes generating, utilizing a cross-modal attention model, a plurality of text-aware visual representations from the plurality of text representations and the plurality of sets of frame representations. In some implementations, the series of acts 600 includes determining, utilizing a topic-boundary prediction model comprising a bi-directional LSTM and a multilayer perceptron, a sequence of topic-boundary labels for the plurality of transcript sentences from the plurality of text representations and the plurality of text-aware visual representations.

For example, in some implementations, the series of acts 600 includes generating the plurality of text representations by utilizing the text encoder to encode, for each transcript sentence of the plurality of transcript sentences, contextualized features into a text representation; and generating the plurality of sets of frame representations by utilizing the frame encoder to extract, for each set of video frames of the plurality of sets of video frames, features of visual signals within a time interval corresponding to a transcript sentence of the plurality of transcript sentences.

Moreover, in some implementations, the series of acts 600 includes generating the plurality of text-aware visual representations by: determining, for each text representation of the plurality of text representations, a query vector utilizing a query feedforward layer of the cross-modal attention model; and determining, for each set of frame representations of the plurality of sets of frame representations, a key matrix utilizing a key feedforward layer of the cross-modal attention model and a value matrix utilizing a value feedforward layer of the cross-modal attention model. Furthermore, in some implementations, the series of acts 600 includes generating the plurality of text-aware visual representations further by combining, for each text representation of the plurality of text representations and a corresponding set of frame representations of the plurality of sets of frame representations, the query vector with the key matrix and the value matrix to generate a text-aware visual representation.

Additionally, in some implementations, the series of acts 600 includes determining the sequence of topic-boundary labels for the plurality of transcript sentences by: combining, for each transcript sentence of the plurality of transcript sentences, a corresponding text-aware visual representation of the plurality of text-aware visual representations and a corresponding text representation of the plurality of text representations; and determining, utilizing the bi-directional LSTM of the topic-boundary prediction model, hidden states of each transcript sentence of the plurality of transcript sentences from the combined corresponding text-aware visual representation and corresponding text representation. Moreover, in some implementations, the series of acts 600 includes determining the sequence of topic-boundary labels for the plurality of transcript sentences further by: determining, utilizing the multilayer perceptron of the topic-boundary prediction model, a binary prediction for each topic-boundary label of the sequence of topic-boundary labels by comparing the hidden states of each transcript sentence with a predetermined topic-boundary threshold. Furthermore, in some implementations, the series of acts 600 includes determining topic chapters for a video associated with the video transcript by paring each topic-boundary label with a time stamp of a corresponding transcript sentence of the video transcript.

In addition, in some implementations, the series of acts 600 includes generating, utilizing a text encoder, a text representation for a transcript sentence of a video transcript; generating, utilizing a frame encoder, a set of frame representations for a set of video frames associated with the transcript sentence; generating, utilizing a cross-modal attention model, a text-aware visual representation from the text representation and the set of frame representations; and determining a topic-boundary label for the transcript sentence from the text representation and the text-aware visual representation.

For example, in some implementations, the series of acts 600 includes generating the text representation for the transcript sentence by encoding contextualized features of the transcript sentence; and generating the set of frame representations for the set of video frames by extracting features of visual signals of video frames within a time interval corresponding to a beginning time stamp and an ending time stamp of the transcript sentence. Moreover, in some implementations, the series of acts 600 includes generating the text-aware visual representation by: determining, utilizing a query feedforward layer of the cross-modal attention model, a query vector from the text representation; determining, utilizing a key feedforward layer of the cross-modal attention model, a key matrix from the set of frame representations; and combining the query vector and the key matrix to generate the text-aware visual representation.

Furthermore, in some implementations, the series of acts 600 includes determining the topic-boundary label for the transcript sentence by: combining the text-aware visual representation and the text representation; determining, utilizing a bi-directional LSTM of a topic-boundary prediction model, hidden states of the transcript sentence from the combined text-aware visual representation and the text representation; and determining, utilizing a multilayer perceptron of the topic-boundary prediction model, a binary prediction for the topic-boundary label by comparing the hidden states with a predetermined topic-boundary threshold. Additionally, in some implementations, the series of acts 600 includes generating an additional text-aware visual representation for an additional transcript sentence; determining an additional topic-boundary label for the additional transcript sentence from the additional text-aware visual representation and an additional text representation for the additional transcript sentence; and combining the topic-boundary label and the additional topic-boundary label into a sequence of labels for the video transcript. Moreover, in some implementations, the series of acts 600 includes determining the hidden states of the transcript sentence by utilizing the bi-directional LSTM to evaluate contextual features of the transcript sentence in relation to the additional transcript sentence.

Embodiments of the present disclosure may comprise or utilize a special purpose or general purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions from a non-transitory computer-readable medium (e.g., memory) and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or generators and/or other electronic devices. When information is transferred, or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface generator (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general purpose computer, special purpose computer, or special purpose processing device to perform a certain function or group of functions. In some embodiments, computer-executable instructions are executed by a general purpose computer to turn the general purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program generators may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), a web service, Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 7:
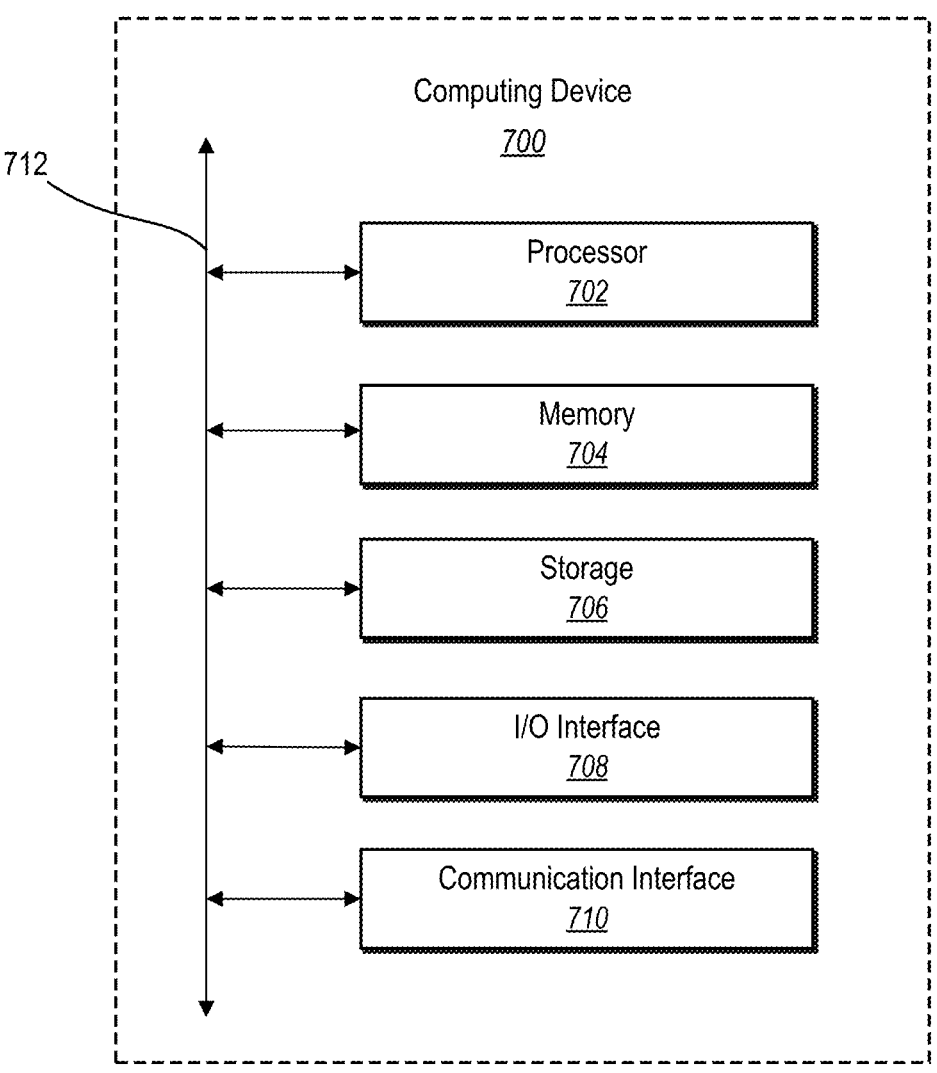
FIG. 7 illustrates a block diagram of an example computing device for implementing one or more embodiments of the present disclosure.

FIG. 7 illustrates a block diagram of an example computing device 700 that may be configured to perform one or more of the processes described above. One will appreciate that one or more computing devices, such as the computing device 700, may represent the computing devices described above (e.g., the computing device(s) 500, the server device(s) 106, or the client device 108). In one or more embodiments, the computing device 700 may be a mobile device (e.g., a mobile telephone, a smartphone, a PDA, a tablet, a laptop, a camera, a tracker, a watch, a wearable device, etc.). In some embodiments, the computing device 700 may be a non-mobile device (e.g., a desktop computer or another type of client device). Further, the computing device 700 may be a server device that includes cloud-based processing and storage capabilities.

As shown in FIG. 7, the computing device 700 can include one or more processor(s) 702, memory 704, a storage device 706, input/output interfaces 708 (or "I/O interfaces 708"), and a communication interface 710, which may be communicatively coupled by way of a communication infrastructure (e.g., bus 712). While the computing device 700 is shown in FIG. 7, the components illustrated in FIG. 7 are not intended to be limiting. Additional or alternative components may be used in other embodiments. Furthermore, in certain embodiments, the computing device 700 includes fewer components than those shown in FIG. 7. Components of the computing device 700 shown in FIG. 7 will now be described in additional detail.

In particular embodiments, the processor(s) 702 includes hardware for executing instructions, such as those making up a computer program. As an example, and not by way of limitation, to execute instructions, the processor(s) 702 may retrieve (or fetch) the instructions from an internal register, an internal cache, memory 704, or a storage device 706 and decode and execute them.

The computing device 700 includes the memory 704, which is coupled to the processor(s) 702. The memory 704 may be used for storing data, metadata, and programs for execution by the processor(s). The memory 704 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 704 may be internal or distributed memory.

The computing device 700 includes the storage device 706 for storing data or instructions. As an example, and not by way of limitation, the storage device 706 can include a non-transitory storage medium described above. The storage device 706 may include a hard disk drive ("HDD"), flash memory, a Universal Serial Bus ("USB") drive or a combination these or other storage devices.

As shown, the computing device 700 includes one or more I/O interfaces 708, which are provided to allow a user to provide input to (such as user strokes), receive output from, and otherwise transfer data to and from the computing device 700. These I/O interfaces 708 may include a mouse, keypad or a keyboard, a touch screen, camera, optical scanner, network interface, modem, other known I/O devices or a combination of such I/O interfaces 708. The touch screen may be activated with a stylus or a finger.

The I/O interfaces 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 708 are configured to provide graphical data to a display for presentation to a user. The graphical data may be representative of one or more graphical user interfaces and/or any other graphical content as may serve a particular implementation.

The computing device 700 can further include a communication interface 710. The communication interface 710 can include hardware, software, or both. The communication interface 710 provides one or more interfaces for communication (such as, for example, packet-based communication) between the computing device and one or more other computing devices or one or more networks. As an example, and not by way of limitation, communication interface 710 may include a network interface controller ("NIC") or network adapter for communicating with an Ethernet or other wire-based network or a wireless NIC ("WNIC") or wireless adapter for communicating with a wireless network, such as a WI-FI. The computing device 700 can further include the bus 712. The bus 712 can include hardware, software, or both that connects components of computing device 700 to each other.

The use in the foregoing description and in the appended claims of the terms "first," "second," "third," etc., is not necessarily to connote a specific order or number of elements. Generally, the terms "first," "second," "third," etc., are used to distinguish between different elements as generic identifiers. Absent a showing that the terms "first," "second," "third," etc., connote a specific order, these terms should not be understood to connote a specific order. Furthermore, absent a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget, and not necessarily to connote that the second widget has two sides.

In the foregoing description, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with fewer or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
generating, utilizing a text encoder, a text representation for a transcript sentence of a video transcript;
generating, utilizing a frame encoder, a set of frame representations for a set of video frames associated with the transcript sentence;
generating, utilizing a cross-modal attention model from the text representation and the set of frame representations, a text-aware visual representation that captures contextual information that the video transcript jointly shares with the set of video frames; and
determining a topic-boundary label for the transcript sentence from the text representation and the text-aware visual representation.

2. The computer-implemented method of claim 1, wherein generating the text representation for the transcript sentence comprises encoding contextualized features of the transcript sentence.

3. The computer-implemented method of claim 1, wherein generating the set of frame representations for the set of video frames comprises extracting features of visual signals of video frames within a time interval corresponding to a beginning time stamp and an ending time stamp of the transcript sentence.

4. The computer-implemented method of claim 1, wherein generating the text-aware visual representation comprises:
determining a query vector from the text representation;
determining a key matrix from the set of frame representations; and
combining the query vector and the key matrix to generate the text-aware visual representation.

5. The computer-implemented method of claim 1, wherein determining the topic-boundary label for the transcript sentence comprises:
combining the text-aware visual representation and the text representation;
determining hidden states of the transcript sentence from the combined text-aware visual representation and the text representation; and
determining a binary prediction for the topic-boundary label by comparing the hidden states with a predetermined topic-boundary threshold.

6. The computer-implemented method of claim 1, further comprising:
determining an additional topic-boundary label for an additional transcript sentence; and
combining the topic-boundary label and the additional topic-boundary label into a sequence of labels for the video transcript.

7. The computer-implemented method of claim 6, further comprising determining topic chapters for a video associated with the video transcript by pairing topic-boundary labels in the sequence of labels with time stamps from the video transcript.

8. A system comprising:
one or more memory devices; and
one or more processors configured to cause the system to:
generate, utilizing a text encoder, a plurality of text representations for a plurality of transcript sentences of a video transcript;
generate, utilizing a frame encoder, a plurality of sets of frame representations for a plurality of sets of video frames associated with the plurality of transcript sentences;

generate, utilizing a cross-modal attention model from the plurality of text representations and the plurality of sets of frame representations, a plurality of text-aware visual representations that capture contextual information that the video transcript jointly shares with the plurality of sets of video frames; and determine, utilizing a topic-boundary prediction model comprising a bi-directional LSTM and a multilayer perceptron, a sequence of topic-boundary labels for the plurality of transcript sentences from the plurality of text representations and the plurality of text-aware visual representations.

9. The system of claim 8, wherein the one or more processors are configured to cause the system to:

generate the plurality of text representations by utilizing the text encoder to encode, for each transcript sentence of the plurality of transcript sentences, contextualized features into a text representation; and generate the plurality of sets of frame representations by utilizing the frame encoder to extract, for each set of video frames of the plurality of sets of video frames, features of visual signals within a time interval corresponding to a transcript sentence of the plurality of transcript sentences.

10. The system of claim 8, wherein the one or more processors are configured to cause the system to generate the plurality of text-aware visual representations by:

determining, for each text representation of the plurality of text representations, a query vector utilizing a query feedforward layer of the cross-modal attention model; and determining, for each set of frame representations of the plurality of sets of frame representations, a key matrix utilizing a key feedforward layer of the cross-modal attention model and a value matrix utilizing a value feedforward layer of the cross-modal attention model.

11. The system of claim 10, wherein the one or more processors are configured to cause the system to generate the plurality of text-aware visual representations further by:

combining, for each text representation of the plurality of text representations and a corresponding set of frame representations of the plurality of sets of frame representations, the query vector with the key matrix and the value matrix to generate a text-aware visual representation.

12. The system of claim 8, wherein the one or more processors are configured to cause the system to determine the sequence of topic-boundary labels for the plurality of transcript sentences by:

combining, for each transcript sentence of the plurality of transcript sentences, a corresponding text-aware visual representation of the plurality of text-aware visual representations and a corresponding text representation of the plurality of text representations; and determining, utilizing the bi-directional LSTM of the topic-boundary prediction model, hidden states of each transcript sentence of the plurality of transcript sentences from the combined corresponding text-aware visual representation and corresponding text representation.

13. The system of claim 12, wherein the one or more processors are configured to cause the system to determine the sequence of topic-boundary labels for the plurality of transcript sentences further by:

determining, utilizing the multilayer perceptron of the topic-boundary prediction model, a binary prediction for each topic-boundary label of the sequence of topic-boundary labels by comparing the hidden states of each transcript sentence with a predetermined topic-boundary threshold.

14. The system of claim 13, wherein the one or more processors are further configured to cause the system to:

determine topic chapters for a video associated with the video transcript by paring each topic-boundary label with a time stamp of a corresponding transcript sentence of the video transcript.

15. A non-transitory computer-readable medium storing executable instructions that, when executed by a processing device, cause the processing device to perform operations comprising:

generating, utilizing a text encoder, a text representation for a transcript sentence of a video transcript;

generating, utilizing a frame encoder, a set of frame representations for a set of video frames associated with the transcript sentence;

generating, utilizing a cross-modal attention model from the text representation and the set of frame representations, a text-aware visual representation that captures contextual information that the video transcript jointly shares with the set of video frames; and determining a topic-boundary label for the transcript sentence from the text representation and the text-aware visual representation.

16. The non-transitory computer-readable medium of claim 15, wherein:

generating the text representation for the transcript sentence comprises encoding contextualized features of the transcript sentence; and generating the set of frame representations for the set of video frames comprises extracting features of visual signals of video frames within a time interval corresponding to a beginning time stamp and an ending time stamp of the transcript sentence.

17. The non-transitory computer-readable medium of claim 15, wherein generating the text-aware visual representation comprises:

determining, utilizing a query feedforward layer of the cross-modal attention model, a query vector from the text representation;

determining, utilizing a key feedforward layer of the cross-modal attention model, a key matrix from the set of frame representations; and combining the query vector and the key matrix to generate the text-aware visual representation.

18. The non-transitory computer-readable medium of claim 15, wherein determining the topic-boundary label for the transcript sentence comprises:

combining the text-aware visual representation and the text representation;

determining, utilizing a bi-directional LSTM of a topic-boundary prediction model, hidden states of the transcript sentence from the combined text-aware visual representation and the text representation; and determining, utilizing a multilayer perceptron of the topic-boundary prediction model, a binary prediction for the topic-boundary label by comparing the hidden states with a predetermined topic-boundary threshold.

19. The non-transitory computer-readable medium of claim 18, wherein the operations further comprise:

generating an additional text-aware visual representation for an additional transcript sentence;

determining an additional topic-boundary label for the additional transcript sentence from the additional text-aware visual representation and an additional text representation for the additional transcript sentence; and combining the topic-boundary label and the additional topic-boundary label into a sequence of labels for the video transcript.

20. The non-transitory computer-readable medium of claim 19, wherein determining the hidden states of the transcript sentence comprises utilizing the bi-directional LSTM to evaluate contextual features of the transcript sentence in relation to the additional transcript sentence.

\* \* \* \* \*